Figure 1:
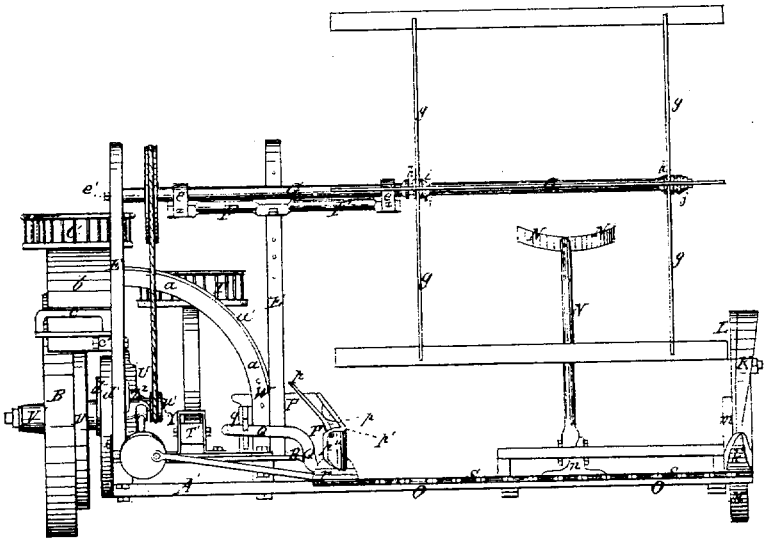

ross Reference Exam

4 Sheets—Sheet 1.

R. DUTTON.

Harvester.

No. 4,217. Reissued Dec. 27, 1870.

N. PETERS, Photo-Lithographer, Washington, D. C.

74. MACHINES
AND MECHANISMS
90
Cross Reference
Examiner
4 Sheets—Sheet 2.
R. DUTTON.
Harvester.
No. 4,217.
Reissued Dec. 27, 1870.
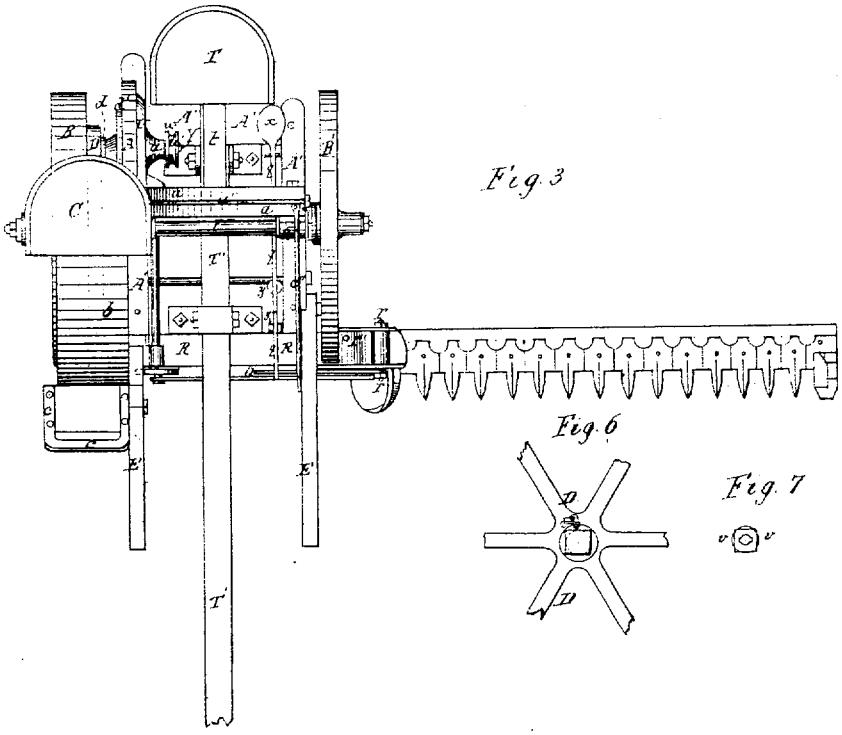
Fig. 3
Fig. 6
Fig. 7
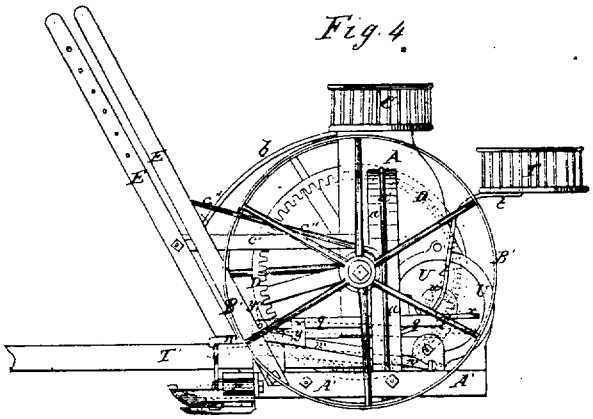
Fig. 4
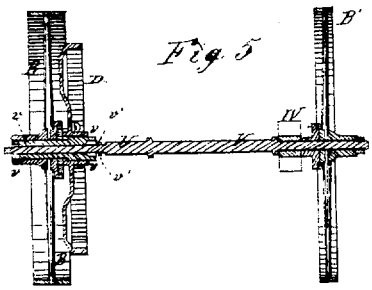
Fig. 5
N. PETERS, Photo-Lithographer, Washington, D. C.

74. MACHINE ELEMENTS AND MECHANISMS.
190
Cross Reference
Examiner
4 Sheets—Sheet 3.
R. DUTTON.
Harvester.
No. 4,217.
Reissued Dec. 27, 1870.
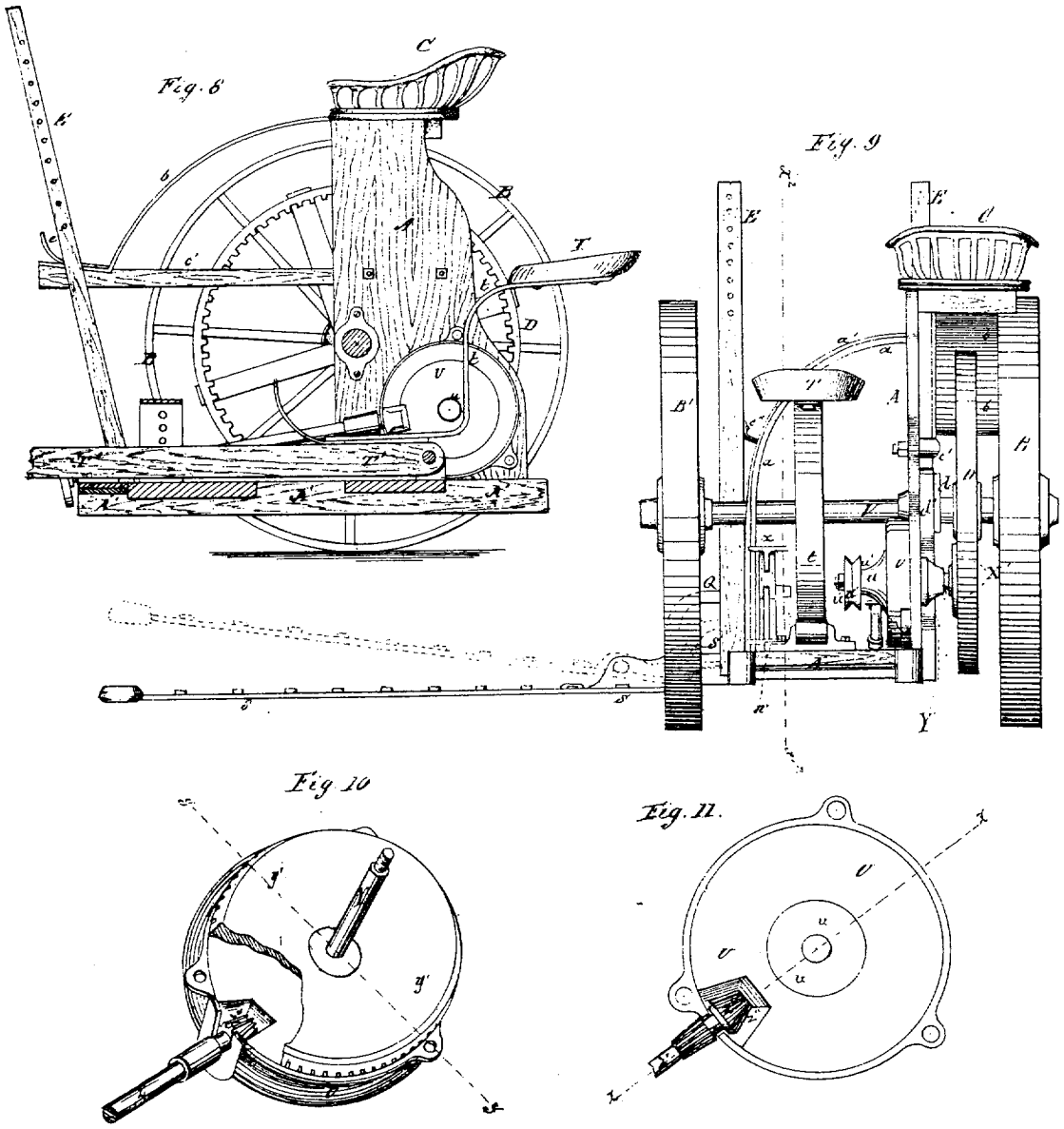
N. PETERS, Photo-Lithographer, Washington, D. C.

90

4 Sheets—Sheet 4.

R. DUTTON.

Harvester.

No. 4,217.

Reissued Dec. 27, 1870.

Witnesses.

J. A. Faubaschmidt
Jno. T. C. Preinkert

Rufus Dutton,
James Dennner,
Agent.

N. PETERS, Photo-Lithographer, Washington, D. C.

UNITED STATES PATENT OFFICE.

RUFUS DUTTON, OF YONKERS, NEW YORK.

IMPROVEMENT IN HARVESTERS.

Specification forming part of Letters Patent No. 31,378, dated February 12, 1861; reissue No. 4,125, dated September 20, 1870; reissue No. 4,217, dated December 27, 1870.

DIVISION B.

*To all whom it may concern:*

Be it known that I, RUFUS DUTTON, formerly of Dayton, Ohio, and now of Yonkers, New York, have invented Improvements in Mowing and Reaping Machines, of which the following is a specification:

The accompanying drawing and following description, with the specifying letters thereof, fully illustrate the invention.

A combined machine, in both its forms, as a mower and as a reaper, and various detached parts thereof, embodying the invention, are represented in the drawing, of which—

Figure 2:
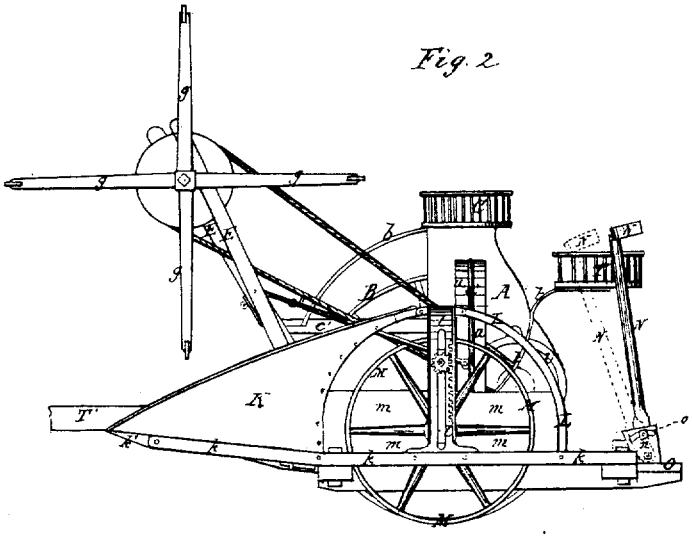
Figure 14:
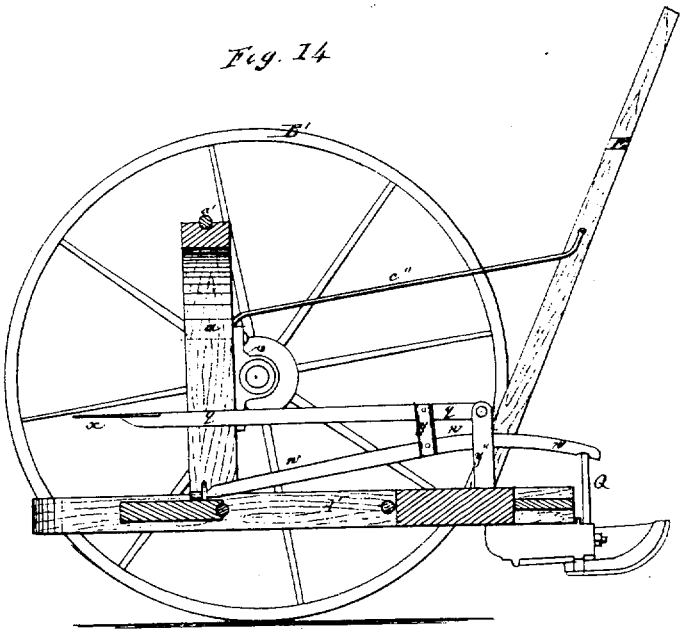
Figure 12:
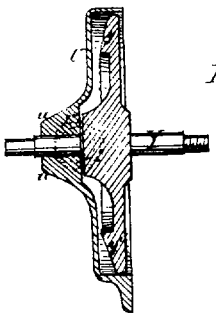
Figure 16:
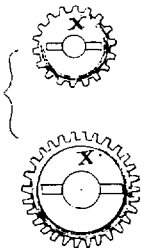
Figure 13:
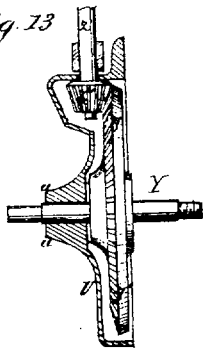
Figure 15:
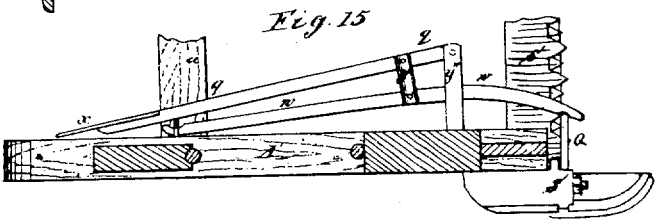

Figure 1 represents a front view of the machine in its form as a reaper. Fig. 2 represents an end view of the machine in its form as a reaper. Fig. 3 represents a top view of the machine in its form as a mower. Fig. 4 represents an end view of the machine in its form as a mower. Fig. 5 represents a sectional view of the driving-wheels and long main axle. Fig. 6 represents an end view of the center of main gear-wheel. Fig. 7 represents an end view of the sleeve-axle. Fig. 8 represents, from the left, a sectional view of the machine, cut by a plane between the draft-tongue and auxiliary driving-wheel, at the place shown by the dotted line $x^2$. Fig. 9 represents a rear view of the machine in its form as a mower. Fig. 10 represents a perspective view of the bevel-gear wheels within the hollow part of the inclosing box or case. Fig. 11 represents an inside view of the hollow part of the inclosing box or case, with the small bevel-gear wheel therein. Fig. 12 represents a vertical view of the hollow part of the inclosing box or case, with the large bevel-gear wheel therein. Fig. 13 represents a lateral view of the hollow part of the inclosing box or case, with the large bevel-gear wheel therein. Fig. 14 represents, from the right, a sectional view of the machine, cut by a plane between the draft-tongue and auxiliary driving-wheel, at the place shown by the dotted line $x^2$. Fig. 15 represents a side view of the combined levers pressed down and the outer end of the finger-bar raised up. Fig. 16 represents a side view of each of the two alternate main spur-pinion gear-wheels.

The drawing represents the whole invention, and all the separate parts thereof; it also represents many things common to all kindred machines, but necessary to develop the invention; and it also represents many other things common and not new, which may be used or not; and the description explains all the devices represented in the drawing. But that part of the invention included in this division relates only to a box or case which incloses the secondary gear-wheels of a mowing or reaping machine, and thereby protects such gear-wheels from grit, bits of grass or straw, or other injuring or impeding substances, and which box or case also supports the journals of the secondary gear-wheel axle; and its nature is as follows: a hollow metal casing-plate, separate and apart from any driving or carrying wheel, which casing-plate makes a main part of a box or case, which incloses and protects the secondary gear-wheels of a mowing or reaping machine; a box or case made of two casing-plates, separate and apart from any driving or carrying wheel, which box or case incloses and protects the secondary gear-wheels of a mowing or reaping machine; a hollow metal casing-plate, separate and apart from any driving or carrying wheel, which casing-plate makes a main part of a box or case which incloses and protects the secondary gear-wheels, and which casing-plate also supports a journal of the secondary gear-wheel axle of a mowing or reaping machine; and a box or case, made of two casing-plates, separate and apart from any driving or carrying wheel, which box or case incloses and protects the secondary gear-wheels, and which box or case also supports the journals of the secondary gear-wheel axle of a mowing or reaping machine.

The description is as follows: A′ represents a common main frame of four sills, in an oblong square form. A represents an upright standard or wide plank, attached to a long sill of the main frame A′, the wide way of the plank standard parallel with the long way of the main frame. *a* represents a curved brace-standard, attached to the upper part of the upright standard A, and to the opposite long sill of the main frame A′. *a′* represents a fastening-rod, through the upright standard A, along in a groove in the upper side of the brace-standard *a*, and through the main frame-sill, to hold firmly the upright to the brace and the brace to the main frame A′. B represents a main driving-wheel, attached in a twofold way to the main frame A′—in one way when the machine is a reaper, on a short main axle, on one end of which is a spur-pinion which meshes into a cog-rack within a curved slot in a segment-plate attached to the wide upright standard A, which arrangement of driving-wheel, short axle, spur-pinion, cog-rack, segment-plate, and upright standard is fully described in my patent of April 27, 1858; and in another way when the machine is a mower, on an alternate or long main axle, through journal-bearings attached to the upright and curved standards A *a* above the main frame A′. B′ represents an auxiliary driving-wheel when the machine is a mower, on a long main axle at the side of the main frame A′, opposite to the main driving-wheel B. *b* represents a curved shield over the main driving-wheel B, and fastened to the wide plank A. C represents an operator's seat, when the machine is a reaper, over the main driving-wheel B, and attached to the wide plank A and curved shield *b*. *c* represents a foot-rest at the bottom of the curved shield *b*. D represents an overhanging annular, internal main gear-wheel on the main axle, between the wide standard A and the main driving-wheel B. E represents a reel-standard extended upwardly from each side of the fore part of the main frame A′. *c′* represents a brace-rod from the wide upright standard A to the outer reel-standard E. *c″* represents another brace-rod from the curved brace-standard *a* to the inner reel-standard E. *d* represents a flange on the short main axle to brace the axle at a right angle to the wide plank A. *d′* represents a curve-cog-slotted segment-plate attached to the outer side of the wide standard A. F represents a reel-supporting arm parallel with the main axle, and bolted to the inner reel-standard E in one of a series of adjusting-holes therein. *e* represents a journal-bearing for a reel-axle on each end of the reel-supporting arm F. *e′* represents a sleeve for a reel-axle journal-bearing, fastened to the outer reel-standard E, in one of a series of adjusting-holes therein. G represents a reel-axle, resting in the journal-bearings *e e′* of the reel-supporting arm F and outer reel-standard E, and overhanging the finger-bar. *g* represents a series of reel-spokes on the reel-axle G, nearly over each end of the finger-bar. *h* represents a flange-plate on the reel-axle G, at the outer side of each series of reel-spokes *g* in the inner sides of which flange-plates are grooves or sockets for the outer sides of the outer reel-spokes. *j* represents another flange-plate on the reel-axle G, at the inner side of each series of reel-spokes, *g*, similar to the first flange-plates *h* for the outer sides of the inner reel-spokes. Between each first and second flange-plate, *h j*, on the reel-axle G is another similar flange-plate, with grooves or sockets on both sides, for the inner sides of each series of reel-spokes *g*. *i* represents a pin through the reel-axle G, next to the second flange *j*, adjacent to the outer reel-axle journal-bearing *e*, to hold together in reel order the inner series of flanges and spokes *h g j*, the first flange, *h*, of which rests against a shoulder on the reel-axle, next to the contiguous journal-bearing. A screw-nut on the overhanging end of the reel axle G holds together in reel order the outer series of flanges and spokes *h g i*, the first flange, *h*, of which rests against another pin or shoulder in or on the reel-axle at the inner side of the series; which arrangement of socket-flanges and fastenings on the reel-axle will hold the spokes, with the blades thereon, in reel order when in use, and allow them to be folded when not in use. K represents a vertical blade attached to the grain-platform, and extended forward to the finger-bar, and at a right angle thereto, to divide the grain to be cut from that to be left standing. *k* represents a cross-sill under the outer side of the grain-platform, extended out under the grain-divider K, and bent upwardly forward of the finger-bar. *k′* represents a metal point on the combined end of the grain-divider and cross-sill K *k*. L represents another curved shield, over the outer side of the grain-platform, behind the grain-divider K, and attached to the cross-sill *k*. M represents a carrying-wheel, attached to the grain-platform under the second curved shield L. *l* represents a slotted upright standard at the outer side of the grain-platform, and attached to the cross-sill *k* and carrying-wheel shield L, nearly in the plane of the curved brace-standard *a*, to support the journal-bearing of the carrying-wheel M. In the slot of the upright carrying-wheel standard *l* is a hanger, which may slide up and down in the slot, and in the bottom of which hanger is a journal-bearing for the carrying-wheel axle, and to the upper part of which hanger, in one of a series of adjusting-holes, is attached the axle of a spur-pinion, which reaches through and meshes into a cog-rack at the fore or hind side of the slot, on the outer side of the standard; which arrangement of carrying-wheel, axle-hanger, spur-pinion, cog-rack, and slotted standard is a modification of my patent of April 27, 1858; and by this and the similar arrangement of the main driving-wheel and its attachments the main frame, grain-platform, and finger-bar, when the machine is a reaper, can be set at any desired distance from the ground. *m* represents a shield-blade across the grain-platform, next to the carrying-wheel M, to keep the cut grain from contact with the wheel. N represents a breast-rest on the hind side of the grain-platform for the raking operator. *n* represents a vertical brace-plate on the grain-platform, at a right angle to the finger-bar, and to which the rest N is pivoted. *o* represents a curved slot in the brace-plate *n*, through which slot and the rest-standard N, above the pivot, is a set-screw bolt, to fasten the breast-rest more or less forward, as short or long grain is cut. O represents a grain-platform, attached to the main frame A′, and behind the finger-bar, when the machine is a reaper. P represents another shield-blade, across the grain-platform O, next to the main frame A′, to keep the cut grain from contact with the frame. *p* represents a gathering-rod, attached to the fore part of the second shield-blade P, and curved upwardly and bent backwardly, and extended across the grain-platform O, to assist in gathering all grain straws onto the platform. *p′* represents a narrow place in the second shield-blade P, over the finger-bar, to allow the reel to drop lower for short grain. *p″* represents a gathering end of the second shield-blade P, forward of the finger-bar, and similar to the grain-divider K, and bent toward the draft-tongue. Q represents a lever, attached to the finger-bar or finger-bar shoe, between the finger-bar pivot and main frame A′, bent upwardly and over the main frame. *w* represents another lever, pivoted to the hind end of the main frame A′, and extended forward and laid on the first lever Q. *y* represents a slotted fulcrum on the upper side and between the ends of the second lever *w*. *y″* represents a slotted upright post on the main frame A′, between the first lever Q and the fulcrum *y* on the second lever *w*, for a guide for, and in and through the slot of which the second lever works. *q* represents another lever, pivoted to the lever-guide *y″*, and extended over the second lever *w*, through the slot of the fulcrum *y*, to the hind part of the main frame A′. *x* represents a foot-tread on the hind end of the third lever *q*; which arrangement of combined levers with the main frame and finger-bar will allow, when the machine is a mower, the outer end of the finger-bar to be raised and lowered by a pressure of the foot. R represents a connecting-bar, attached to the fore part of the main frame A′. S represents a finger-bar, attached to the connecting-bar R near a fore corner of the main frame A′, on the side opposite to the main driving-wheel B, and parallel with the main axle. *r* represents a horizontal pivot-pin, by which the finger-bar S is hinged to the connecting-bar R. *r′* represents a vertical screw-bolt through the connecting-bar R and finger-bar S, between the pivot *r* and main frame A′; which arrangement of bolt and pivot will allow the finger-bar to be rigid when the machine is a reaper, and flexible when the machine is a mower—rigid with the bolt, and flexible without it. T′ represents a draft-tongue, hinged, when the machine is a mower, to the hind part of the main frame A′, between the driving-wheels B B′, and rigidly additionally attached, when the machine is a reaper, by a bolt through one of a series of adjusting-holes in a slotted standard on the fore part of the frame, in the slot of which standard the tongue lies or works. T represents an operator's seat, when the machine is a mower, on the hind end of the draft-tongue T′. *t* represents a spring, by which the mowing operator's seat T is both made elastic and attached to the draft-tongue T′. U represents a hollow, shell-like metal casing-plate, fastened against the wide plank or flat casing-plate A on the side opposite to the main driving-wheel B, to make a box or case to inclose the secondary gear-wheels, and thereby protect such gear-wheels from injuring or impeding substances. *u* represents a tubular prolongation of the hollow of the shell-like casing-plate U, to support a journal of a secondary gear-wheel axle. V′ represents, when the machine is a reaper, a short main-axle attached to the segment-plate *d′* of the wide, upright, flat standard casing-plate A, for the main driving-wheel B and main gear-wheel D. V represents, when the machine is a mower, an alternate or long main axle in journal-bearings attached to the upright, wide, flat casing-plate standard A and curved brace-standard *a*, for the main and auxiliary driving-wheels B B′ and main gear-wheel D. W represents a journal-bearing attached to the curved brace-standard *a*, for the inner journal of a long main axle, V. Y represents a secondary gear-wheel axle, horizontally through the casing-plates A U, and parallel with the main axle V′ or V. X represents, when the machine is a reaper, a large main spur-pinion gear-wheel, on the outer end of the secondary gear-wheel axle Y, and which meshes into the main gear wheel D. X′ represents, when the machine is a mower, a small main spur-pinion gear-wheel, on the same axle and in the same place, but instead of the large main spur-pinion gear-wheel X; which arrangement of alternate spur-pinions will give to the cutters a faster motion for mowing and a slower motion for reaping. Z represents a journal-bearing attached to the wide, upright, flat casing-plate standard A, for the outer journal of the long main axle V. *w′* represents a reel-chain pulley on the inner end of the secondary gear-wheel axle Y. *v* represents a sleeve-axle, outwardly similar to the short main axle V′, over one end of the long main axle V, when the machine is a mower, and within the main driving-wheel B and main gear-wheel D, in the end of which sleeve-axle, next to the main frame A′, are radial slots, from the sleeve-hole outward, as shown in Fig. 7, and which end of the sleeve-axle is square, and fits in a square hole or recess in the end of the hub of the main gear-wheel, as shown in Fig. 6. *v′* represents pins fastened to the long main axle V, and within the slots of the sleeve-axle *v*, when the machine is a mower; which arrangement of pins and slots, and square axle end and square hub-hole, attaches the main gear-wheel rigidly to the sleeve-axle, and the sleeve-axle rigidly to the long main axle, in a revolving direction, so that, when the long main axle revolves, the main gear-wheel will revolve with it. *y′* represents a large bevel-gear wheel on the secondary gear-wheel axle Y, and within the inclosing box or case A U, as shown in Figs. 12 and 13. *z′* represents a crank-wheel axle, at a right angle to the long main axle V or V′, and in journal-bearings attached to the fore end of the main frame A′, and to the inner side of the flat casing-plate A. $z''$ represents a bevel-pinion gear-wheel on the inner end of the crank-wheel axle $z'$, within the inclosing box or case A U, and within a lip or pocket of the hollow casing-plate U, and which meshes into the large bevel-gear wheel $y'$.

There is a series of ratchet-teeth in a recess in the hub of the main gear-wheel D, in the end next to the main driving-wheel B. There is also a ratchet on the hub of the main driving-wheel B, on the end next to the main gear-wheel D; and the driving-wheel hub end and ratchet fit and go into the gear-wheel hub-end recess and ratchet-teeth, and the ratchet and ratchet-teeth are so arranged that the driving-wheel, when moving forward, will clutch and drive the gear-wheel, but when moving backward it will not do it. The auxiliary driving-wheel B′ is similarly coupled with a ratchet-plate on the long main axle V, when the machine is a mower, so that the driving-wheel, when moving forward, will clutch and drive the axle, and thereby drive the main gear-wheel D, but when moving backward will not do it.

The nature of the work of a mowing or reaping machine, and of the ground where such work is done, necessarily throws more or less of dust, dirt, grit, bits of grass or straw, or other clogging or injuring substances, into and between the cogs of all open and exposed gear-wheels, as is the common way for the gear-wheels of such machines, which greatly impede and rapidly wear such gear-wheels, especially of the bevel-gear wheels or secondary gear-wheels. But that part of the invention included in this division, by inclosing the secondary gear-wheels $y'$ $y''$ in the box or case A U, sufficiently protects such gear-wheels from injuring or impeding substances.

The strain on the gearing of a mowing or reaping machine is very great, and therefore necessarily great on the main frame, which holds and supports the gearing, and this strain tends greatly to warp and twist the frame, when the frame is made of several sills framed together, as is the common way for such machines; and when the journal-bearings are fastened to different sills or parts of the frame this strain often so warps and twists the frame as to get the journal-bearings so much out of alignment as to bind the journals and make them run hard. But that part of the invention included in this division, by attaching the journal-bearings of the secondary gear-wheel axle Y and a journal-bearing of the crank-wheel axle $z'$ directly to the stiff, wide, flat standard casing-plate A, and to the hollow casing plate U, which is itself fastened to the flat casing-plate A, insures a perfect alignment of those journal-bearings at all times. The stiff, flat, casing-plate A, relatively to itself, is always in the same position, and always maintains with itself, in the same relative position, whatever journal-bearings are attached to it, and thus all the journal-bearings attached to the combined casing-plates A U will keep a uniform alignment.

When the journal-bearings of any of the gear-wheel axles of a mowing or reaping machine are light gudgeon-boxes, and are fastened by screw-bolts to the main frame or to attachments thereof, as is the common way for such machines, the strain on the gearing, and consequent twisting of the frame, tend to twist the bearings and jar them loose, and to make them rattle and break. But that part of the invention included in this division, in supporting the journals of the secondary gear-wheel axle Y by the box or case A U, gives increased solidity and permanency to the journal-supports.

The combination of a main frame, A′, with an upright, wide, flat casing-plate standard, A, and curved brace-standard $a$, provided with journal-bearings W Z, to support the gearing above the frame, and for the journals of the long main axle V; the combination of an alternate main axle, V, and auxiliary driving-wheel B′ with a main frame, A′, and main driving-wheel B, to give more power to the cutters when the machine is a mower; and the combination of a reel-supporting arm, F, with two reel-standards, E, to give three journal-bearings to an overhanging reel, when the machine is a reaper, are not a part of this division of the invention; but they are the subjects of another division, and of a separate patent therefor.

The following is a summary of what is included in this division of the invention, and for which I desire a separate patent:

I claim—

1. A hollow metal casing-plate, separate and apart from any driving or carrying wheel, which casing-plate makes one side or main part of a box or case which incloses or protects the secondary gear-wheels of a mowing or reaping machine, substantially as described.

2. A box or case made, substantially as described, of two casing-plates, separate and apart from any driving or carrying wheel, which box or case incloses and protects the secondary gear-wheels of a mowing or reaping machine.

3. A hollow metal casing-plate, separate and apart from any driving or carrying wheel, which casing-plate makes one side or main part of a box or case which incloses and protects the secondary gear-wheels, and which casing-plate also supports a journal of the secondary gear-wheel axle of a mowing or reaping machine, substantially as described.

4. A box or case made, substantially as described, of two casing-plates, separate and apart from any driving or carrying wheel, which box or case incloses and protects the secondary gear-wheels, and also supports the journals of the secondary gear-wheel axle, of a mowing or reaping machine.

Witnesses: RUFUS DUTTON.

M. D. GETTY,

ARTHUR W. ELLIOT.